Figure 2:
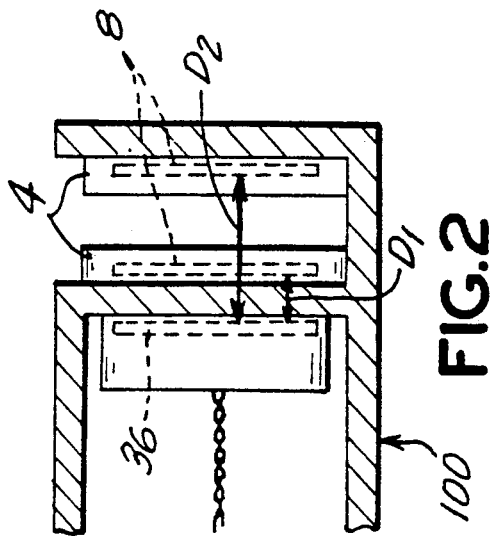

United States Patent [19]
Glasspool

[11] Patent Number: 5,013,898
[45] Date of Patent: May 7, 1991

[54] DATA DETECTION, POWER TRANSFER AND POWER REGULATION FOR DATA STORAGE DEVICES

[75] Inventor: Andrew J. K. Glasspool, Addlestone, United Kingdom

[73] Assignee: Mars Incorporated, McLean, Va.

[21] Appl. No.: 211,857

[22] PCT Filed: Nov. 3, 1987

[86] PCT No.: PCT/GB87/00778
§ 371 Date: Aug. 22, 1988
§ 102(e) Date: Aug. 22, 1988

[87] PCT Pub. No.: WO88/03684
PCT Pub. Date: May 19, 1988

[30] Foreign Application Priority Data
Nov. 3, 1986 [GB] United Kingdom ............... 8626233

[51] Int. Cl.⁵ ............................................. G06K 7/08
[52] U.S. Cl. ................................. 235/449; 235/492; 235/493
[58] Field of Search ............... 235/492, 493, 449, 439, 235/380, 382; 455/73

[56] References Cited
U.S. PATENT DOCUMENTS

| | | | |
|---|---|---|---|
| 3,299,424 | 1/1967 | Vinding | 340/825.34 |
| 3,689,885 | 9/1972 | Kaplan et al. | 340/825.34 |
| 4,333,072 | 6/1982 | Beigel . | |
| 4,517,563 | 5/1985 | Diamant . | |
| 4,546,241 | 10/1985 | Walton . | |
| 4,580,041 | 4/1986 | Walton . | |
| 4,600,829 | 7/1986 | Walton . | |
| 4,785,166 | 11/1988 | Kushima | 235/492 X |
| 4,797,541 | 1/1989 | Billings et al. | 235/492 X |
| 4,845,347 | 7/1989 | McCrindle et al. | 235/492 X |

FOREIGN PATENT DOCUMENTS

| | | |
|---|---|---|
| 0101125 | 2/1984 | European Pat. Off. . |
| 0147099 | 10/1985 | European Pat. Off. . |
| 0204542 | 12/1986 | European Pat. Off. . |
| 8400869 | 3/1984 | PCT Int'l Appl. . |
| 8401688 | 5/1984 | PCT Int'l Appl. . |
| 8503831 | 8/1985 | PCT Int'l Appl. . |
| 8706375 | 10/1987 | PCT Int'l Appl. . |
| 2148075 | 5/1985 | United Kingdom . |
| 2149623 | 6/1985 | United Kingdom . |
| 2165423 | 4/1986 | United Kingdom . |
| 2167586 | 5/1986 | United Kingdom . |
| 2177528 | 1/1987 | United Kingdom . |

Primary Examiner—David Trafton
Attorney, Agent, or Firm—Davis Hoxie Faithfull & Hapgood

[57] ABSTRACT

Apparatus for delivering power to and communicating with a data-storing device, e.g. a token, in a contactless manner includes a resonant circuit arranged for inductive coupling with the device. The values of the components are selected to give a relatively constant power transfer over the possible range of distances between the inductances. Communications from the device resulting in changes in the token impedance are detected by sensing current changes in the resonant circuit. The power transmitted by the resonant circuit is limited to prevent excessive power damaging devices whose characteristics are such that they may be damaged by higher power levels. Devices which require higher levels can send a signal which results in the limit being bypassed.

32 Claims, 1 Drawing Sheet

DATA DETECTION, POWER TRANSFER AND POWER REGULATION FOR DATA STORAGE DEVICES

This invention relates to data-storing devices, e.g. in the form of tokens, and apparatus for communicating with such devices.

EP-A-147099 describes examples of data-storing tokens and apparatus for communicating with such tokens. In one embodiment, a token interrogator is inductively coupled to a token and transmits a carrier signal which is received by the token and used to generate power for operating the token. Data is transmitted to the token by selectively interrupting the carrier. The token transmits data to the interrogator by altering its impedance, in particular by shorting-out its antenna, which is sensed by a receiving coil in the interrogator.

According to one aspect of the present invention there is provided an interrogator for, transmitting power to a data-storing device and for receiving data from the device, the interrogator comprising a resonant circuit arranged for inductive coupling to the device in order to transmit said power.

The invention will be described below primarily in the context of its application to portable data-storing tokens, but is applicable also in other areas.

It has been found that the use of a resonant circuit can have significant advantages in the particular field of powering and interrogating tokens in a contactless manner. One problem with this area arises from the fact that it is necessary for the token to receive an adequate but not excessive amount of power from the interrogator and this can be very difficult to achieve, especially when limited power is available, because manufacturing tolerances may cause significant variations in the token characteristics and the positioning of the tokens in relation to the interrogator may tend to vary. It has now been found that such problems can be avoided or substantially mitigated by the use of a resonant circuit in the interrogator. In particular, it has been found that the power transferred to a token in such a system can be arranged to vary very little over a relatively large range of distances between the token and the interrogator. In a preferred embodiment to be described below, the token interrogator comprises means for supporting the token in proximity to an interrogator inductance forming part of a resonant circuit, the support means being such that the distance between the token and the inductance can vary between pre-defined limits, and the power transferred to the token varies by not more than 20% irrespective of the position of the token within those limits.

The token interrogator has a drive circuit which drives the resonant circuit in order to transmit power to the token. The total impedance presented to the drive circuit is, in the presence of a token, formed by a combination of the impedances of the resonant circuit and the token circuit, which are inductively coupled. The mutual inductance will vary in dependence on the distance between the token and interrogator inductances. The total impedance presented to the drive circuit can be considered as a combination of $X_i$ and $R_i$, which are respectively the reactive and resistive impedances of the resonant circuit itself, and $X_t$ and $R_t$ which are the reactive and resistive impedances of the token as they appear to the drive circuit. The values of these quantities will be dependent upon circuit components (i.e. values of inductances and capacitances, sizes of coils, numbers of turns, etc.), and the frequency at which the resonant circuit is driven, as well as the distance between the token and interrogator inductances.

It has been found that the power transferred to the token can be made relatively independent of distance between the token and interrogator inductances by making $R_t$ substantially equal to, or preferably slightly less than, $R_i$ when the distance between the token and interrogator inductances is a maximum, and by making $R_t$ greater than $R_i$ when the distance is a minimum. Also, the drive circuit is arranged so that the current supplied to the resonant circuit increases as the total impedance presented to the drive circuit decreases. The consequence of this arrangement is that when the distance between the inductances is at a minimum, the fact that $R_t$ is greater than $R_i$ means that the efficiency of power transferred to the token is high. As the token is moved away, $R_t$ decreases so the efficiency decreases, but the combined impedances of the resonant circuit and the token tends to decrease and therefore the current supplied to the resonant circuit increases which to a certain extent compensates for the decrease in efficiency.

This is a simplification of the behavior of the circuitry, as many other factors play a part in this behavior. One further factor results from the fact that the token will change the resonant frequency of the interrogator circuit. If the frequency supplied to the resonant circuit is constant, the current supplied will vary as the resonant frequency of the circuit changes. This effect can be used to improve further the independence of power transfer to the token with distance. In particular, as the token is moved away from the interrogator the decrease in efficiency of power transfer can to some extent be offset by the resonant frequency of the interrogator circuit approaching the operating frequency of the drive circuit so that the power transmitted by the interrogator increases. If desired, the circuits can be arranged so that the resonant frequency when the token is at a predetermined distance from the interrogator within the limits mentioned above is equal to the operating frequency.

The use of a resonant circuit has a number of other advantages. It enables the overall efficiency of power transfer to be relatively high which is particularly useful in situations in which there is little power available, such as in payphones. It also enables the interrogator inductance to generate a signal which is substantially free from harmonics. Preferably, the circuit is a series resonant circuit, although it may alternatively or additionally be a parallel resonant circuit.

Although the use of a resonant circuit is advantageous, it could generate problems when the power signal is additionally used for communications. In particular, any ringing of the token or interrogator circuits could interfere with such communications. Accordingly, in a preferred embodiment of the invention the driving of the interrogator resonant circuit is intermittently altered or modulated, e.g. interrupted, to transmit data to the token, and the circuit is shorted out in the modulation periods so as to prevent ringing of the circuit. It has been found that such an arrangement also prevents ringing of the token circuitry, presumably because any such ringing is damped by the interrogator.

A further advantage of using a resonant circuit is achieved in a preferred embodiment of the invention in which means responsive to changes in the combined impedances of the resonant circuit and the token are provided for detecting data generated by the token. The token generates data by altering the impedance across or in series with an inductance, which is preferably the same inductance as is used for receiving power from the interrogator. The impedance may be altered by shorting the inductance or rendering it open-circuit. This change causes a change in the total impedance seen by the interrogator's drive circuit, and a corresponding change in the current in the resonant circuit. By detecting these changes in order to sense the token data, the need for a separate data-receiving coil is obviated.

Preferably, the data-detecting circuitry responds only to fast changes in the current in the resonant circuit so as to avoid erroneous results caused by drift or by variations in the positions or characteristics of different tokens.

Preferably, means are provided to limit the current in the resonant circuit. It has been found that manufacturing tolerances result in tokens which operate at slightly different voltages and require different amounts of power to be generated by the interrogator. The limiting of the current prevents excessive power, which could damage a token, from being supplied. Preferably, however, means are provided for selectively permitting an increase in the current in the resonant circuit beyond that permitted by the above-mentioned current limit, for example by by-passing the current-limiting means. This could be useful for supplying power to tokens whose characteristics determine that additional power is needed and would not result in damage. It is envisaged that this increase in power may be triggered by a signal from the token indicating that it has not got sufficient power.

This is regarded as an independently inventive aspect of the invention, in which there is provided a data-storing device which receives power in a contactless manner, and which is operable to check the received power against a reference level and, depending upon the results of the check, is further operable to generate a signal indicating that further power is required. Thus, if for example a token has a non-volatile memory which for reliability requires a relatively high level of power to be supplied to the token, the token can check whether the supply of power is sufficient for this and if not generate a signal to request an increase in the power. Clearly, for this to occur the token would have to be receiving sufficient power to perform a limited number of operations and to establish communications.

According to a still further aspect of the invention there is provided an interrogator operable to send power to and communicate with a data-storing device in a contactless manner, the interrogator being responsive to a signal generated by the device for increasing the power supplied thereto.

Figure 1:
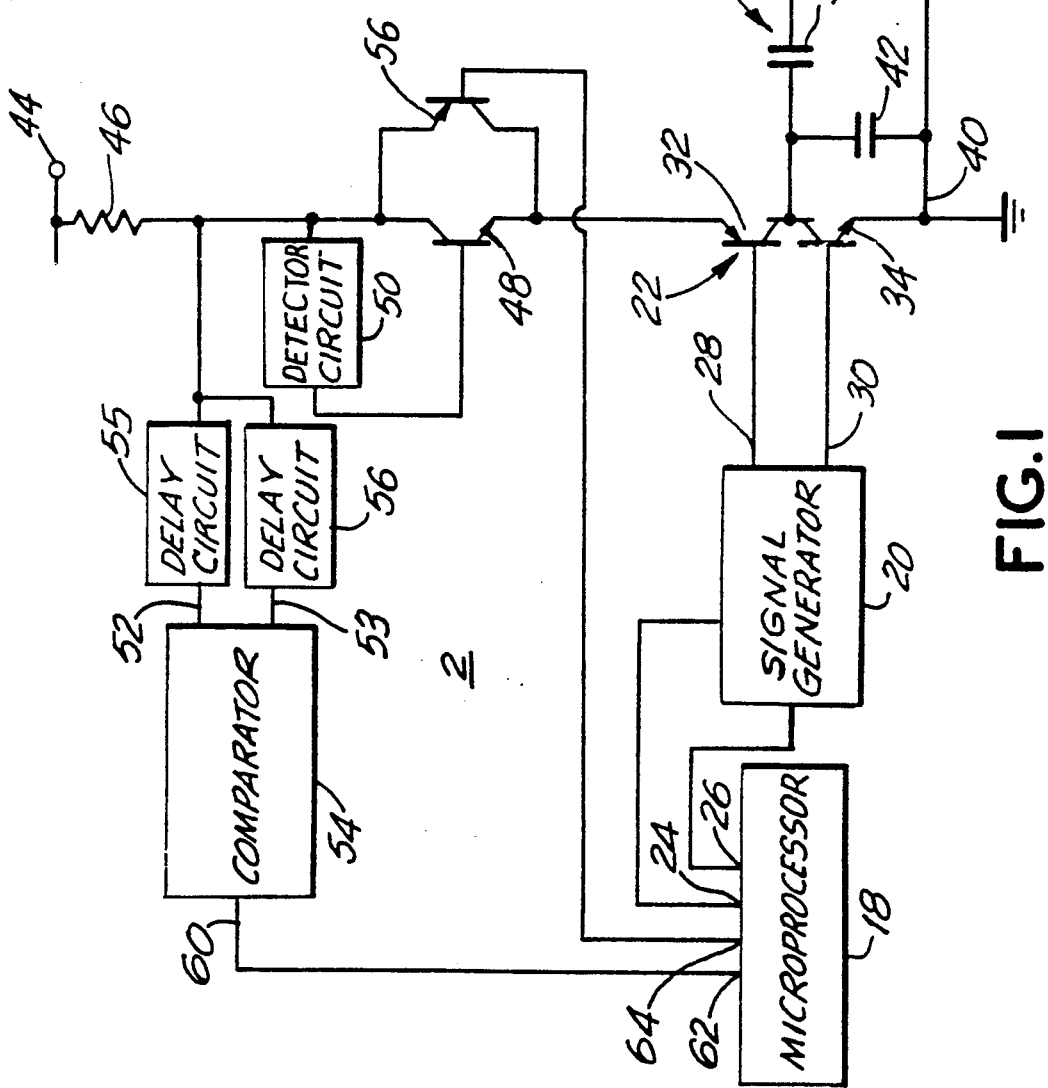

An arrangement according to the invention will now be described with reference to the accompanying drawings, in which:

FIG. 1 illustrates, partly in block diagram form, the circuit of a token handling system incorporating apparatus in accordance with the invention; and FIG. 2 is a schematic section view showing a data-storing device in two possible positions in a support means of the apparatus.

The system comprises a token interrogator 2 and a token 4. The interrogator 2 supplies power to the token using a resonant circuit 6 inductively coupled to the token, transmits data to the token by selectively interrupting the power transmissions, and detects data generated by the token by sensing changes in the combined impedance of the resonant circuit 6 and the token 4.

The token 4 has an antenna coil 8 connected in parallel with a capacitor 10 to form a resonant circuit. Signals developed across the resonant circuit are supplied to a power supply data detection and control circuit ("PSΔΔ C circuit"), indicated by the block 12. This controls the operation of a switch 14 which selectively shorts out the antenna coil 8 in order to provide the impedance changes which are detected by the interrogator. The token 4 could correspond to the token illustrated in FIG. 7 of EP-A-0147099.

The token interrogator 2 comprises a microprocessor 18 controlling a signal generator 20 which in turn controls an output stage 22 which drives the resonant circuit 6. In particular, the microprocessor 18 has two outputs, 24 and 26, connected to the signal generator 20. The signal generator 20 receives a pulse train from the output 26 and frequency-divides the pulse train and separates this into two signals which appear on output lines 28 and 30. The pulse trains on these lines are such that each pulse in each train appears during the interval between successive pulses in the other train, and is inverted with regard to the pulses in the other train.

These pulse trains drive respective transistors 32 and 34 in the output stage 22 in an alternating fashion.

The resonant circuit 6 is a series-resonant circuit, formed by an interrogator coil 36 and a capacitor 37, connected across terminals 38 and 40, with an additional capacitor 42 in parallel across the terminals.

The terminal 38 is connected via the main current carrying electrodes of transistor 32 to a positive supply, and via the main current-carrying electrodes of transistor 34 to ground. The terminal 40 is connected to ground. Accordingly, while the circuit is operating and the transistors 32 and 34 are driven alternately, the terminal 38 is connected to the positive supply when transistor 32 is on and transistor 34 is off, and connected to ground when transistor 32 is off and transistor 34 is on. This drives the resonant circuit 6 in a push-pull manner. If desired, a push-pull drive arrangement could also be connected to terminal 40 so as to increase the power generated by the resonant circuit 6.

The resonant circuit 6 includes capacitor 42 connected across its terminals 38 and 40. The capacitor 42 makes the circuit 6 behave to a limited extent as a parallel resonant circuit, and consequently slightly increases the input impedance, which makes the circuit easier to drive. Nevertheless, the circuit 6 as a whole acts primarily as a series resonant circuit with a low input impedance which generates high voltages across the reactive components 36 and 37 when driven at or close to its resonant frequency. An additional function of the capacitor 42 is to reduce harmonics in the signals generated by the resonant circuit 6.

The driving of the output stage 22 takes place while the signal level on output 24 of microprocessor 18 is high. When the microprocessor alters this to a low level, the circuit 20 holds the signals on lines 28 and 30 high, so that the transistor 32 is turned off and transistor 34 is turned on. Thus, the terminals 38 and 40 of the resonant circuit 6 are shorted and the resonant circuit ceases transmission. In this way, by providing signals on line 24, the microprocessor 18 can selectively interrupt power transmissions to the token 4 and thereby transmit data to the token as explained in EP-A-0147099. It will be noted that during the periods when power is not being transmitted by the circuit 6, the terminals of the circuit are shorted so that ringing cannot occur. This also damps any ringing of the circuit of the token 4. If the transistor 34 has a very low impedance when it is switched on, the resonant circuit 6 may not be sufficiently damped to halt the ringing quickly. To avoid such problems, means may be provided for connecting a damping impedance into the resonant circuit at the appropriate times. For example, a further transistor may be connected in series between the transistor 34 and ground, with a resistor connected in parallel across the main current-carrying electrodes of the further transistor. When the transistor 34 is switched on, the further transistor could be switched off, thereby rendering effective the parallel-connected resistor which acts as a damping impedance.

The output stage 22 is connected to a positive supply terminal 44 via a series-connected circuit comprising a resistor 46 and a current-limiting transistor 48. The current consumed by the resonant circuit 6 causes a voltage to develop across the resistor 46, which is sensed by a detector circuit 50. After the current has reached a certain limit, the detector 50 decreases the voltage applied to the base of transistor 48 so as to alter the effective impedance presented by the transistor 48 and thereby prevent further increases in the current. This prevents the token 4 from receiving an excessive amount of power.

Instead of merely limiting the current to the resonant circuit in order to limit token power, the circuit could be arranged to control the power applied to the resonant circuit so as to cause the power transferred to the token to be constant irrespective of token position and characteristics. The ratio of the power transferred to the token to the total power used to drive the resonant circuit will depend upon these parameters. It will be appreciated that if the detector is arranged so its output is suitably dependent on the current in and voltage across the resonant circuit, the detector can vary the power applied to the resonant circuit so as to render the total amount of power transferred to the token substantially constant. For example, as the distance between the interrogator and the token increases, the current flow through the resonant circuit will increase but the efficiency of power transfer will decrease. The detector 50 can sense the current increases and make the voltage applied to the resonant circuit increase sufficiently to compensate for the decreased efficiency of power transfer.

The voltage developed across the resistor 46 is also applied to inputs 52 and 53 of a comparator 54, via respective delay circuits 55 and 56. As mentioned above, the token 4 shorts-out its antenna coil 8 in order to transmit data. This results in a decrease in the impedance of the combined resonant circuit 6 and token 4, and therefore an increase in current in the resonant circuit 6. The switch 14 of the token 4 is operated at a relatively fast rate, and the detector circuit 50 has a relatively long response time, so that the rapid changes in current flow do not significantly alter the output of the detector 50. The delay circuits 55 and 56 respectively have relatively long and short time constants. Changes in the current flow when the token is transmitting data result in variations in the voltage at comparator terminal 53, but occur too quickly for the delay circuit 55 to pass them to the terminal 52. This produces pulses on an output line 60 which are delivered to an input 62 of the microprocessor 18. Thus, data transmitted by the token is received at this input 62.

Any slow changes in the current flow through the resonant circuit 6, such as caused by drift, will not result in output pulses on line 60, because they will be tracked by the voltages at both comparator terminals 52 and 53.

The arrangement described above permits the microprocessor 18 to cause power to be transmitted to a token 4, while the signal on line 24 is high, to cause data to be transmitted to a token by selectively altering the level of the signal on line 24, and to detect at input 62 data generated by the token. Accordingly, communication can be established between the interrogator 2 and the token 4.

After communication has been initiated, the token transmits to the interrogator a signal indicating whether or not it has sufficient power to carry out all its operations reliably. In particular, the token has a non-volatile memory (not shown) which requires that there be a higher voltage for reliable entry of data than is needed for communication between the token 4 and the interrogator 2. The token includes a comparator (not shown) having a first input connected to a reference voltage and a second input connected to the supply voltage, so that the output of the comparator indicates whether the token is receiving sufficient power.

The microprocessor 18 receives the communication from the token. If this indicates that insufficient power is being received, the microprocessor outputs a low signal level at output terminal 64. This switches on a transistor 66 having its main current-carrying electrodes connected in parallel to those of the transistor 48. Thus, the current limiting transistor 48 is effectively by-passed and the current delivered to the resonant circuit 6 is increased, with a consequent increase in the power transmitted to the token 4. Preferably, the circuit is arranged so that in such circumstances the detector 50 is disabled.

The token interrogator 2 is installed in a token handling apparatus which has means 100 (see FIG. 2) for supporting the token in proximity to the interrogator coil 36. The support means is designed so that the distance between the inductances of the token and the interrogator 36 may vary between a minimum $D_1$ and a maximum $D_2$, which may for example be 0 and 10 mm, or possibly 3 and 7 mm. This is to allow for variations in token thickness, and to ensure that tokens can pass through the apparatus without becoming jammed.

Assuming that the impedance of the resonant circuit 6 is $Z_{i} = R_i + jX_i$ (where $R_i$ and $X_i$ are respectively the resistive and reactive parts of the impedance of circuit 6), that the reflected impedance of the token 4 in the resonant circuit 6 is $Z_t = R_t + jX_t$ (where $R_t$ and $X_t$ are respectively the resistive and reactive components of the reflected token impedance), and that the voltage applied to the resonant circuit is V, then the power P transferred to the token is given by $$P = \frac{V^2 \times R_t}{(R_i + R_t)^2 + (X_t + X_i)^2}$$

$R_t$ and $X_t$ depend in a complex manner on a number of factors including the distance between the token and interrogator inductances 8 and 36 respectively. It has been found that if the minimum and maximum values of the distance D between the inductances are $D_1$ and $D_2$ respectively, then for good behavior throughout this range of distances the circuit should be designed such that:

When $D=D_1$, $R_t > R_i$, and preferably $R_t <= 10 R_i$ (or more preferably 7 $R_i$)

When $D=D_2$, $R_t < = R_i$, and preferably $R_t > = 0.1 R_i$ (or more preferably 0.2 $R_i$)

Also, preferably $D = (D_1 + D_2)/2$ when $R_t = R_i$

In order to increase power transfer, the system preferably operates at resonance and therefore $X_t = -X_i$. However, $X_t$ varies with distance D, and it is preferred that this relationship be true when $D <= D_2$ and $D >= (D_1 + D_2)/2$.

Preferably, $R_i$ is not greater than 15Ω and the token resistance is greater than $R_i/2$. Preferably, $R_t < 70Ω$ throughout the range of distances $D_1$ to $D_2$.

To optimize communications, it is desired that the frequency of the drive signal applied to the resonant circuit be substantially equal to the resonant frequency of the combination of the token and resonant circuit, preferably when the token is at its maximum distance, and when the token antenna is shorted (or open-circuit, if this is how data is transmitted by the token).

If desired, the coil 36 of the interrogator could be formed by two coil portions positioned on respective sides of the token. This would increase power transfer and make it more independent of token position. In this case, the distance between the token and interrogator inductances is assumed to be a maximum when the token is positioned mid-way between the coil portions.

The arrangements described above enable effective token communications over a relatively large range of distances and are therefore particularly suited for arrangements in which the interrogator coil is situated on only one side of the token, and arrangements in which the distance between the token and the interrogator can vary by large amounts (eg. when the token is not confined in a slot during interrogation). Some particular proposed arrangements which may take advantage of the features of the present invention include an interrogator in the form of a device operable to read tokens in the shape of cards or keys, the interrogator having its coil positioned adjacent to an exterior surface to which a user presents the key or card for interrogation. Another desired arrangement is one in which the interrogator is in the form of a hand-held probe which can be placed near a data-storing device or token attached to or forming part of an object (eg. a vending machine, or a printed circuit board). The data-storing device could store data concerning operations which have been carried out by or on a machine to which it is attached, or data identifying an object to which it is attached.

In the above arrangements, the inductance in the token is short-circuited or rendered open-circuit to transmit data to the interrogator. Other ways of altering the impedance of the token to transmit data are possible. For example, the value of a capacitance connected across the inductance could be altered.

I claim:

1. Apparatus for communicating with a data-storing device in a contactless manner, the apparatus comprising a resonant circuit having an inductive component which is arranged for inductive coupling to an inductor in the device for delivering power to the device, data detection means coupled to the resonant circuit for sensing changes in the combined impedances of the resonant circuit and the device to detect data transmitted by changes in the impedance of the device, and means for supporting the device such that the inductances of the apparatus and the device are separated by a distance D, wherein D can vary from a minimum of D1, wherein the impedance of the resonant circuit $Z_i = -R_i + jX_i$, wherein the reflected impedance of the device in the resonant circuit $Z_t = R_t + jX_t$, and wherein, when $D = D1$, $R_t > R_i$.

2. The apparatus as claimed in claim 1, wherein the resonant circuit is a series resonant circuit.

3. The apparatus as claimed in claims 1 or 2 wherein, when $D = D_1$, $R_t <= 10 R_i$.

4. The apparatus as claimed in claims 1 or 2, wherein D can vary to a maximum of D, and wherein, when $D = D_2$, $R_t >= 0.1 R_i$.

5. The apparatus as claimed in claim 4, wherein, when $D = D_2$, $R_t <= R_i$.

6. Apparatus for communicating with a data-storing device in a contactless manner, the apparatus comprising a resonant circuit having an inductive component which is arranged for inductive coupling to an inductor in the device for delivering power to the device, data detection means coupled to the resonant circuit for sensing changes in the combined impedances of the resonant circuit and the device to detect data transmitted by changes in the impedance of the device, and means for supporting the device such that the inductances of the apparatus and the device are separated by a distance D, wherein D can very to a maximum of D2, wherein the impedance of the resonant circuit $Z_i = -R_i + jX_i$, wherein the reflected impedance of the device in the resonant circuit $Z_t1 = R_t + jX_t$, and wherein, when $D = D2$, $R_t >= 0.1 R_i$.

7. The apparatus as claimed in claim 6, wherein, when $D = D_2$, $R_t <= R_i$.

8. Apparatus as claimed in claims 1 or 6, comprising means for driving the resonant circuit at a frequency which is substantially equal to the resonant frequency of the combined resonant circuit and data-storing device.

9. Apparatus as claimed in claims 1 or 6, wherein said data detection means comprises means responsive to only short-term changes in impedance.

10. The apparatus as claimed in claims 1 or 6, further comprising means for controlling the power at which the resonant circuit is driven so as to prevent excessive power transfer to a data-storing device.

11. Apparatus for communicating with a data-storing device in a contactless manner, the apparatus comprising a resonant circuit having an inductive component which is arranged for inductive coupling to an inductor in the device for delivering power to the device, a current limiting means for controlling the power at which the resonant circuit is driven to prevent excessive power transfer to the data storing device, wherein said current limiting means has a slow response time permitting short term power changes.

12. Apparatus for communicating with a data-storing device in a contactless manner, the apparatus comprising a resonant circuit having an inductive component which is arranged for inductive coupling to an inductor in the device for delivering power to the device, means for controlling the power at which the resonant circuit is driven to prevent excessive power transfer to a data storing device, and means for overriding the power control.

13. The apparatus as claimed in claim 12, wherein said overriding means is responsive to a signal generated by the device for overriding the power control in order to increase the power to the device.

14. The apparatus as claimed in claim 12, further comprising means for temporarily altering the supply of power by the resonant circuit to the device in order to transmit data to the device.

15. Apparatus as claimed in claim 14, including means for reducing the impedance across the resonant circuit during periods in which the power to the device is altered in order to prevent ringing of the circuit.

16. Apparatus for delivering power in a contactless manner to a data-storing device and for receiving data from the device, the apparatus being responsive to a predetermined signal from the device for increasing the power supplied thereto.

17. A data-storing device having power level sensing means, and means responsive thereto for generating a signal indicating that further power to the device is required.

18. A device as claimed in claim 17, wherein the device has means for receiving power in a contactless manner.

19. A device as claimed in claim 17 or 18, wherein the device has a non-volatile writable memory.

20. The apparatus as claimed in claim 3, wherein D can vary to a maximum of D2, and wherein, when $D=D2$, $R_t >= 0.1 R_i$.

21. The apparatus as claimed in claim 20, wherein, when $D=D2$, $R_t <= R_i$.

22. The apparatus as claimed in claim 6, wherein the resonant circuit is a series resonant circuit.

23. The apparatus as claimed in claim 22, wherein, when $D=D2$, $R_t <= R_i$.

24. The apparatus as claimed in claim 4, wherein D1 = 3 millimeters and D2 = 7 millimeters.

25. The apparatus as claimed in claim 4, wherein D1 = 0 millimeters and D2 = 10 millimeters.

26. The apparatus as claimed in claim 10, wherein said means for controlling the power is a current limiting means having a slow response time, permitting short term power changes.

27. The apparatus as claimed in claim 10, further comprising means for overriding the power control.

28. The apparatus as claimed in claim 26, further comprising means for overriding the power control.

29. The apparatus as claimed in claim 27, wherein said overriding means is responsive to a signal generated by the device for overriding the power control to increase the power to the device.

30. The apparatus as claimed in claim 28, wherein said overriding means is responsive to a signal generated by the device for overridding the power control to increase the power to the device.

31. The apparatus as claimed in claims 1 or 6, further comprising means for temporarily altering the supply of power by the resonant circuit too the device in order to transmit data to the device.

32. The apparatus as claimed in claim 31, further comprising means for reducing the impedance across the resonant circuit during periods which the power to the device is altered to prevent ringing of the circuit.

* * * * *

UNITED STATES PATENT AND TRADEMARK OFFICE
CERTIFICATE OF CORRECTION

PATENT NO. : 5,013,898
DATED : May 7, 1991
INVENTOR(S) : Glasspool

It is certified that error appears in the above—identified patent and that said Letters Patent is hereby corrected as shown below:

Column 4, line 7, insert --,-- following "supply".

Column 4, line 8, delete "("PS▲▲ C" preceding "circuit")" and insert --("PSDDC" --.

Column 6, line 50, delete "$Zi_i$" and insert --$Z_i$--.

Column 7, line 7, insert --⟩-- following "D".

Claim 3, column 8, line 9, insert --,-- following "2".

Claim 4, column 8, line 12, delete "D" following "of", and insert --$D_2$--.

Claim 6, column 8, line 31, delete "$Z_tI$" following "circuit" and insert --$Z_t$--.

Claim 15, column 9, line 5, delete "Apparatus" and insert --The apparatus--.

UNITED STATES PATENT AND TRADEMARK OFFICE
CERTIFICATE OF CORRECTION

PATENT NO. : 5,013,898
DATED : May 7, 1991
INVENTOR(S) : Andrew J.K. Glasspool It is certified that error appears in the above-identified patent and that said Letters Patent is hereby corrected as shown below:

Claim 16, column 9, line 9, delete "Apparatus" and insert --The apparatus--.

Signed and Sealed this

Seventh Day of September, 1993

*Attest:*

BRUCE LEHMAN

*Attesting Officer*   *Commissioner of Patents and Trademarks*